United States Patent
Grantges, Jr.

(10) Patent No.: US 6,324,648 B1
(45) Date of Patent: Nov. 27, 2001

(54) SECURE GATEWAY HAVING USER IDENTIFICATION AND PASSWORD AUTHENTICATION

(75) Inventor: David R. Grantges, Jr., Clearwater, FL (US)

(73) Assignee: GTE Service Corporation, Irving, TX (US)

(*) Notice: Subject to any disclaimer, the term of this patent is extended or adjusted under 35 U.S.C. 154(b) by 0 days.

(21) Appl. No.: 09/471,901

(22) Filed: Dec. 23, 1999

Related U.S. Application Data
(60) Provisional application No. 60/170,686, filed on Dec. 14, 1999.

(51) Int. Cl.[7] ................................................. H02H 3/05
(52) U.S. Cl. ........................ 713/201; 713/202; 380/21; 709/229
(58) Field of Search ........................ 713/200–202, 713/183, 157, 168–171; 380/21; 709/229

(56) References Cited

U.S. PATENT DOCUMENTS

| | | | |
|---|---|---|---|
| 5,196,840 | 3/1993 | Leith et al. | 340/825.3 |
| 5,560,008 * | 9/1996 | Johnson et al. | 395/650 |
| 5,828,833 * | 10/1998 | Beville et al. | 395/187.01 |
| 5,923,756 * | 7/1999 | Shambroom | 380/21 |
| 5,991,810 | 11/1999 | Shapiro et al. | 709/229 |
| 6,076,168 * | 6/2000 | Fiveash et al. | 713/201 |
| 6,092,196 * | 7/2000 | Reiche | 713/200 |
| 6,182,142 * | 1/2001 | Win et al. | 709/229 |
| 6,182,229 * | 1/2001 | Nielsen | 713/202 |

\* cited by examiner

*Primary Examiner*—Norman M. Wright
(74) *Attorney, Agent, or Firm*—Leonard Charles Suchyta; James K. Weixel (57) ABSTRACT

A computer system provides authenticated access for a client computer over an insecure, public network to one of a plurality of destination servers on private, secure network, through the use of a client-side X.509 digital certificate. A firewall is disposed between the insecure, public network and the private network. A demilitarized zone (DMZ) proxy server intercepts messages destined for the destination servers, and forwards the intercepted messages through the firewall to a gateway on the private network. The gateway is configured to create a cookie, based on the selection of one of a several applications available on the private network. The cookie contains an identifier sufficient to identify the destination server corresponding to the selected application. Messages from the client computer include the cookie. The gateway processes the cookie and appends the identifier on a destination URL portion of the messages for routing. An alternate computer system authenticates a user of a remote client computer on the insecure network side of the firewall using a user identification and password.

16 Claims, 6 Drawing Sheets

SECURE GATEWAY HAVING USER IDENTIFICATION AND PASSWORD AUTHENTICATION

RELATED APPLICATIONS

This application claims the benefit of U.S. provisional application Ser. No. 60/170,686, filed Dec. 14, 1999, entitled "SECURE GATEWAY HAVING ROUTING FEATURE".

BACKGROUND OF THE INVENTION

1. Field of the Invention

The present invention relates generally to communications systems and networks, and, more particularly, to a secure gateway for providing access from a client computer over an insecure public network to one of a plurality of destination servers on a secure private network.

2. Description of the Related Art

Computer networks are known generally as including a wide variety of computing devices, such as client computers and servers, interconnected by various connection media. In particular, it is commonplace for an institution, such as a corporation, to provide such a network. Such network may include a multiplicity of servers executing a corresponding number of application programs ("applications"). The corporation's employees may use one or more of these applications to carry out the business of the corporation. Such a network may be characterized as a private, secure network, since it is accessible under normal, expected operating conditions only by suitably authorized individuals.

It has become increasingly popular, and in many instances a business necessity, for users ("clients") to remotely access the private network. While the remote access is sometimes accomplished through dedicated, secure lines, it is increasingly done through the global communications network known as the Internet. Computer networks, particularly the Internet, can be vulnerable to security breaches. In particular, the Internet is generally considered insecure, in view of its widespread access and use by the public at-large. Accordingly, a problem arises as to how to securely allow the client access to the resources available on the private, secure network (e.g., the applications) over a generally insecure public network, such as the Internet.

One general approach taken in the art has been to employ various encryption schemes. For example, a protocol known as a Secure Sockets Layer (SSL) protocol protects information transmitted across the insecure Internet using encryption. Another known authentication scheme involves the use of a so-called digital certificate, which also uses encryption. As used, the digital certificate can be attached to an electronic message to verify to the recipient that the sender is who the sender claims to be. A well-known and widely accepted standard for digital certificates is ITU X.509.

While the above-described techniques are effective for what they purport to accomplish, providing access to a private, secure network over an insecure network such as the Internet requires a comprehensive combination of many security features. Accordingly, it is also known in the art to securely provide remote access by way of a gateway architecture. One known gateway architecture includes a firewall, a web server, an information collector (IC), an application message router (AMR), and an authorization handler.

The firewall is between the private, secure network and the public, insecure network. The web server and the information collector are on the insecure, public network side of the firewall. The web server communicates with the information collector using the well-known Gateway Interface (CGI), the specification for transferring information between a web server and a CGI program. The AMR and the authorization handler are on the private, secure network side of the firewall. The IC and AMR communicate through the firewall by way of an interprocess communication (IPC) mechanism. In this known gateway architecture, a user wishing to gain access to an application on the private network first accesses the web server using a conventional web browser. The user authenticates him or herself by providing a digital certificate.

The web server forwards the particulars of the digital certificate to the IC according to a CGI script. The information collector, in turn, forwards the digital certificate through the firewall to the AMR via the IPC mechanism. The AMR, also via an IPC mechanism, queries the authorization handler to authenticate the user. The authorization handler's response is sent back to the AMR. If the user is successfully authenticated, access is permitted. There are, however, several shortcomings to this approach.

First, the information collector and application message router are custom programmed software applications. Accordingly, they must be ported for each new platform used. This platform dependence results in increased costs (and delays) when implemented on new platforms.

Second, the known gateway has throughput limitations. The CGI interface is relatively slow, as is the IC-to-AMR link because, among other things, the IPC mechanism is single-threaded.

Third, certain data (e.g., static HTML, graphics, etc.) is more vulnerable to security breaches (i.e., being "hacked") because it is maintained on the web server, on the Internet (insecure) side of the private network firewall. This situation is undesirable.

Another known gateway for providing access to a private network over an insecure network involves a two-level client-side digital certificate authentication mechanism. One proxy server is provided for every application on the private network, which are disposed on the Internet side of the firewall. One of the proxy servers performs a first level check of the digital certificate, and then passes the digital certificate data through the firewall via HTTPS for the second-level check by an authorization server. While this configuration addresses some of the shortcomings described above, routing in this approach is relatively inefficient for multiple applications (i.e., requires multiple proxy servers).

In addition, some applications on the private network do not require digital certificate strength authentication. In these situations for known gateway architectures there is no authentication of the user outside of the firewall (i.e., the gateways described above authenticate, at least at some level, before allowing further access across the firewall for complete authentication).

There is therefore a need to provide an improved gateway that minimizes or eliminates one or more of the shortcomings as set forth above.

SUMMARY OF THE INVENTION

One advantage of a computer system according to the present invention is that it authenticates a user of a remote client computer where use of digital certificates is undesirable or simply unavailable. Another advantage is that the authentication, which preferably involves a user identification (ID) and password, is performed on the insecure side of a firewall system separating the private secure network and the insecure public network (i.e., Internet). Authentication must be successfully performed prior to allowing access to the private network. In addition, the architecture of a computer system according to the invention maintains sensitive authentication data on an authorization server, which is on the secure, private network side of the firewall, reducing the likelihood of a successful "hacker" intrusion.

A computer system is provided according to the present invention that allows access from a client computer over an insecure private network. The computer system includes a firewall system, a proxy server, an authorization server, a web server and a gateway. The firewall system is disposed between the insecure public network (e.g., the Internet) and the secure, private network. The proxy server and the web server are on the insecure network side of the firewall system and the gateway and the authorization server are on the private, secure network side of the firewall system.

The authentication server is configured to authenticate the user of the client computer based on a user identification (ID) and password from the user of the client computer. The web server is configured to pass the user ID and password through the firewall to the authorization server. The web server is further configured to build an authentication cookie having a valid condition when the authorization server authenticates the user of the client computer based on the user ID and password.

According to the present invention, the proxy server is further configured to pass a message from the client computer to the destination server via the gateway when the authentication cookie is valid.

Other objects, features, and advantages of the present invention will become apparent to one skilled in the art from the following detailed description and accompanying drawings illustrating features of this invention by way of example, but not by way of limitation.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 1:
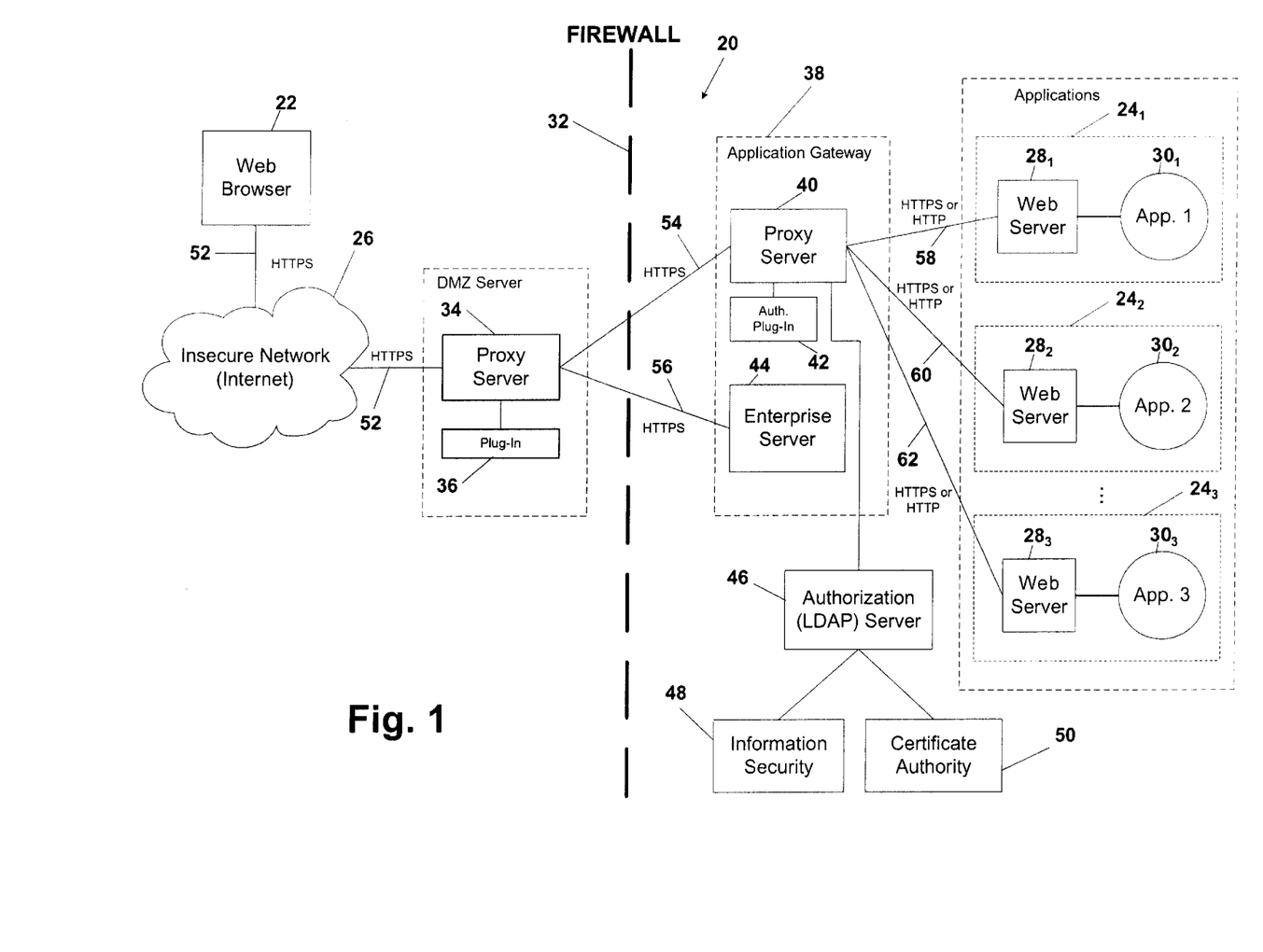
FIG. 1 is a simplified block diagram view of a first computer system according to the present invention.

Referring now to the drawings wherein like reference numerals are used to identify identical components in the various views, FIG. 1 is a simplified block diagram of a computer system useful for authenticating a user 18, namely, computer system 20, a first embodiment of the present invention. In the illustrated, first embodiment, authentication of the user 18 occurs through the use of digital certificates, such as ITU X.509 digital certificates. It should be understood that such digital certificates may be transferred to other client computers 22. It is the user 18 that is being authenticated, not the client computer 22.

Computer system 20 is configured generally to provide access by user 18 of a client computer 22 to one of a plurality of software applications $24_1$, $24_2$, ..., $24_3$. Such access is over an insecure network 26, such as the publicly used Internet, to a private, secure network where applications $24_1$, $24_2$, ..., $24_3$ reside. Each application $24_1$, $24_2$, ..., $24_3$ includes a respective web server (hereinafter "destination server") $28_1$, $28_2$, ..., $28_3$, and an application program $30_1$, $30_2$, ..., $30_3$. Computer system 20 includes a firewall system 32, a proxy server 34 with a plug-in 36, an application gateway 38 comprising a gateway proxy server 40 with a plug-in 42 and a gateway web server 44, and an authorization server 46. Also shown in FIG. 1 is an Information Security block 48, a certificate authority 50, a first secure connection 52, a second secure connection 54, and a third secure connection 56.

Computer system 20 overcomes many of the shortcomings of prior gateway systems by providing a platform independent implementation via the use of commercial-of-the-shelf (COTS) components, as well as enhanced throughput via the use of SSL-based hypertext transfer protocol (HTTPS) for secure and fast messaging across the firewall. In addition, sensitive data is maintained on the secure, private network side of the firewall 32, not on the insecure, public network side of firewall, reducing the opportunity for hackers to breach security.

Before proceeding to a detailed description of computer system 20, a general overview of the operation established by the invention will be set forth, as viewed by user 18 of client computer 22. Initially, user 18 of client computer 22 enters the destination URL into a web browser portion of client computer 22. The web browser then issues an HTTP request across insecure network 26, which is routed to proxy server 34. The user 18 may then be presented with a "popup" message that a secure network connection is about to be established. The message may also ask which X.509 digital certificate user 18 wishes to use for authentication. The user-selected X.509 digital certificate is then sent to proxy server 34. At this point, a first level authentication is conducted, outside the firewall, by proxy server 34 (e.g., checks to see whether the X.509 certificate has been issued by a predetermined preapproved certificate authority). If authenticated at this level, proxy server 34 then sends the information contained in the client's digital certificate through firewall system 32 to gateway 38 to be authenticated at a second, more substantive level. The second level authentication involves examining the particulars of the X.509 digital certificate using the data stored on authorization server 46. If user 18 is authorized to access multiple applications, the next item after the "popup" message to be displayed to user 18 is an "options page", presenting the multiple choices. Once a particular application is selected, the next item to be displayed for user 18 is a welcome page of the selected application. Secure, authenticated remote access is complete. In accordance with the present invention, computer system 20 provides an efficient mechanism for routing the remote user 18 of client computer 22 to the selected application being served by one of the destination servers.

With continued reference to FIG. 1, client computer 22 may be any one of a plurality of conventional computing devices, such as, for example only, a personal computer (PC) running a Microsoft Windows operating system (e.g., Windows 95, Windows NT, Windows 2000), a Macintosh computer (Apple Computer) or a UNIX workstation. Client computer 22 is preferably configured to include a web browser, such as, for example only, Netscape Communicator Version 4.7, commercially available from Netscape Communications Corporation. The web browser portion of client computer 22 preferably includes the capabilities of transmitting, receiving, and verifying digital certificates, such as ITU X.509 digital authentication certificates. In addition, the web browser portion preferably includes the capability of establishing first secure connection 52 with proxy server 34 via, for example, the publicly available Secure Sockets Layer (SSL) protocol, Version 3.0, available from Netscape Communications Corp. As illustrated in FIG. 1, first secure connection 52 is designated an "HTTPS" connection, indicating the use of the SSL protocol. Of course, other mechanisms for establishing a secure connection, such as the S-HTTP protocol may also be used; provided, however, that both ends are compatible with such other protocol. Connection 52 may be based on a TCP/IP network connection protocol.

Applications $24_1$, $24_2$, ..., $24_3$, particularly programs $30_1$, $30_2$, ..., $30_3$ thereof, exist independently of computer system 20. That is, no modifications to programs $30_1$, $30_2$, ..., $30_3$, are required for use with computer system 20. For example, applications $24_1$, $24_2$, ..., $24_3$, may involve Carrier Access Billing, Subscription Services (e.g., long distance carriers), and the like. Destination servers $28_1$, $28_2$, ..., $28_3$, are preferably compatible with the ubiquitous HyperText Transfer Protocol (HTTP 1.1), which is employed over connections 58, 60, and 62. Destination servers $28_1$, $28_2$, ..., $28_3$ interface computer system 20 with respective programs $30_1$, $30_2$, ..., $30_3$. In effect, remote user 18 provides the web browser, and the application being accorded secure access provides the destination server. Computer system 20 provides the remainder of the needed connectivity and security.

Firewall system 32 is disposed between insecure public network 26 and the secure, private network on which the applications $24_1$, $24_2$, ..., $24_3$, reside and execute. Firewall system 32 may be implemented in software, hardware, or both. Firewall system 32 is configured to examine all messages destined for, or exiting from, the private, secure network, and to block those that do not meet predetermined security criteria. One criteria involves the destination location on the private network for incoming messages. In this regard, firewall system 32 restricts communication originating from the insecure network 26, only allowing passage of messages destined for application gateway 38 on the private network (e.g., gateway proxy server 40). Firewall system 32 may comprise conventional apparatus known to those of ordinary skill in the art. For example, firewall system 32 may comprise commercially available apparatus referred to as a CheckPoint One firewall, from Check Point Software Technologies, Inc., Redwood City, Calif., USA.

Proxy server 34 is disposed on the insecure public network side of firewall system 32, in a so-called Demilitarized Zone (DMZ). A DMZ is located between the insecure network 26 (e.g., the Internet) and the private network's first line of defense, for example, firewall system 32. DMZ proxy server 34 is disposed between client computer 22 and the real servers associated with the substantive applications, namely, destination servers $28_1$, $28_2$, ..., $28_3$. Proxy servers in general may be characterized as providing both mapping and data caching functions. In the context of the present invention, DMZ proxy server 34 is provided principally for mapping purposes.

DMZ proxy server 34 is further configured to establish first secure connection 52 with client computer 22, particularly the web browser portion thereof. The HTTPS connection 52 provides for the encryption of the information passing between client computer 22 and DMZ proxy server 34. It should be understood that other suitably secure connection protocols may be used, for example, secure HTTP (S-HTTP); provided, however, that both ends are compatible with such other protocol.

DMZ proxy server 34 is still further configured to perform a first level authentication of the user of client computer 22. In one embodiment DMZ proxy server 34 is programmed to examine the X.509 digital certificate provided by client computer 22 to determine whether it issued from a predetermined, preapproved Certificate Authority. DMZ proxy server 34, in this embodiment, does not compare the particulars of the X.509 digital certificate with information on file for authentication. This is because the information required to conduct such a comparison is safely stored behind firewall system 32 on authorization server 46 on the private network. DMZ proxy server 34 may comprise conventional hardware and software known to those in the art. For example, DMZ proxy server 34 may comprise Netscape proxy server software, commercially available from Netscape Communications Corporation.

Plug-in 36 is associated with DMZ proxy server 34, and is configured to provide enhanced functionality. As will be described in greater detail below, in a preferred embodiment, plug-in 36 is configured to capture the particular details of the X.509 digital certificate, and forward those details across firewall system 32 to gateway proxy server 40. Through this functionality, the user 18 of client computer 22 can be safely authenticated on the private network side of firewall system 32.

Application gateway 38 is disposed on the private network side of firewall system 32, between DMZ proxy server 34 and applications $24_1$, $24_2$, ..., $24_3$. Gateway 38 includes gateway proxy server 40 and gateway web server 44. Gateway proxy server 40 is configured to establish second secure connection 54 across firewall system 32 with DMZ proxy server 34. In one embodiment, secure connection 54 comprises an HTTPS connection, although other secure protocols may be employed as described above; provided, however, that both ends are compatible with such other protocol. In response to DMZ proxy server 34's request to establish secure connection 54, gateway proxy server 40 presents its X.509 digital certificate, and requests that DMZ proxy server 34 present its X.509 digital certificate by a return message. This handshaking is well understood in the art, and will not be elaborated on in any further detail. It is described, however, to emphasize that the X.509 digital certificate being presented to gateway proxy server 40 belongs to DMZ proxy server 34, not the user 18 of client computer 22. The commercially available software on DMZ proxy server 34 does not have built-in capabilities to perform this information forwarding step according to the invention. Accordingly, as described above, plug-in 36 is provided as part of the solution to this problem. The other part of the solution, authorization plug-in 42, is configured, among other things, to extract the data embedded in the message from DMZ proxy server 34 corresponding to the data in the client's certificate. Plug-in 36 (capture and embed) and plug-in 42 (extract and parse) work hand-in-hand in passing the information in the client's digital certificate across firewall system 32 for authentication.

Gateway proxy server 40 further performs well-known mapping functions, and, in accordance with the present invention, efficiently routes messages destined for various applications $24_1, 24_2, \ldots, 24_3$ to the appropriate one of the destination servers $28_1, 28_2, \ldots, 28_3$. Gateway proxy server 40 may comprise conventional apparatus known to those of ordinary skill in the art, such as, for example, Netscape proxy server software running on conventional hardware.

Gateway proxy server 40 is further configured to establish third secure connection 56 within gateway 38 with web server 44. Connection 56 may be established as described above with respect to secure connection 54.

Web server 44 is configured to store various HTML files and graphics, which will be served to client computer 22. In particular, the HTML and graphic files associated with computer system 20 authentication and authorization administration are resident on application gateway server 38. More particularly, web server 44 is configured to provide an "options page" to client computer 22 when user 18 is authenticated and authorized for more than one of applications $24_1, 24_2, \ldots, 24_3$. It should be understood that the use of the word "web" server should not necessarily be limited by any one or more of the meanings ascribed in the art, but rather, only by the appended claims. It is important to note that this data is stored on the secure, private network side of firewall 32, reducing the opportunity for hackers to breach security and access or destroy this data.

Authorization server 46 is preferably disposed on the private network side of firewall system 32. This arrangement minimizes the risk of unauthorized access to or destruction of the sensitive data maintained thereon, since a would-be hacker would have to penetrate the firewall for such activities to occur. In one embodiment, gateway proxy server 40 and authorization server 46 conduct messaging between each other in accordance with a so-called Lightweight Directory Access Protocol (LDAP). Accordingly, authorization server 46 comprises an LDAP-capable server. The information maintained by authorization server 46 includes the particulars of the X.509 digital certificate tendered by the user 18 of client computer 22, the identification of applications $24_1, 24_2, \ldots, 24_3$ to which access by the user 18 has been authorized by an application trustee, and a gateway user identification (ID).

Information Security 48 is an entity that, in one embodiment, updates authorization server 46 with data obtained from both a trustee of an application and certificate authority 50. This process will be described in greater detail in connection with FIG. 6. An administrative interface (not shown) is provided on authorization server 46, and allows any individual classified as an "admin" user to execute certain functions. These functions fall into three main categories: (i) user administration; (ii) application administration; and, (iii) reports. For example, "admin" users may add or delete users, provide for user update/maintenance, provide user searches, add an application, attend to application maintenance, provide login access reports, provide inactive and/or expired user reports, and provide a user list report. The foregoing is exemplary only. Application administration is generally done by a respective application administration support group. However, application trustees are "admin" users and may access this interface as well.

Certificate authority 50 receives applications for X.509 digital certificates from potential users requesting access to applications on the private network. Certificate authority 50 issues an encrypted X.509 digital certificate containing the user's public key and a variety of other information. The particulars of the issued X.509 digital certificate are provided to authorization server 46 for authentication purposes. In one embodiment, a special purpose certificate authority is used to provide digital certificates for authenticating users 18. DMZ proxy server 34, in the described embodiment, only recognizes digital certificates from this special purpose certificate authority. However, it should be understood that other, commercially available certificate authorities, may be substituted for the special purpose certificate authority and remain within the spirit and scope of the present invention. In this case DMZ proxy server 34 may be reconfigured to accept digital certificates issued from other than the special purpose Certificate Authority. Known commercially available certificate authorities include GTE CyberTrust and VeriSign.

Figure 2:
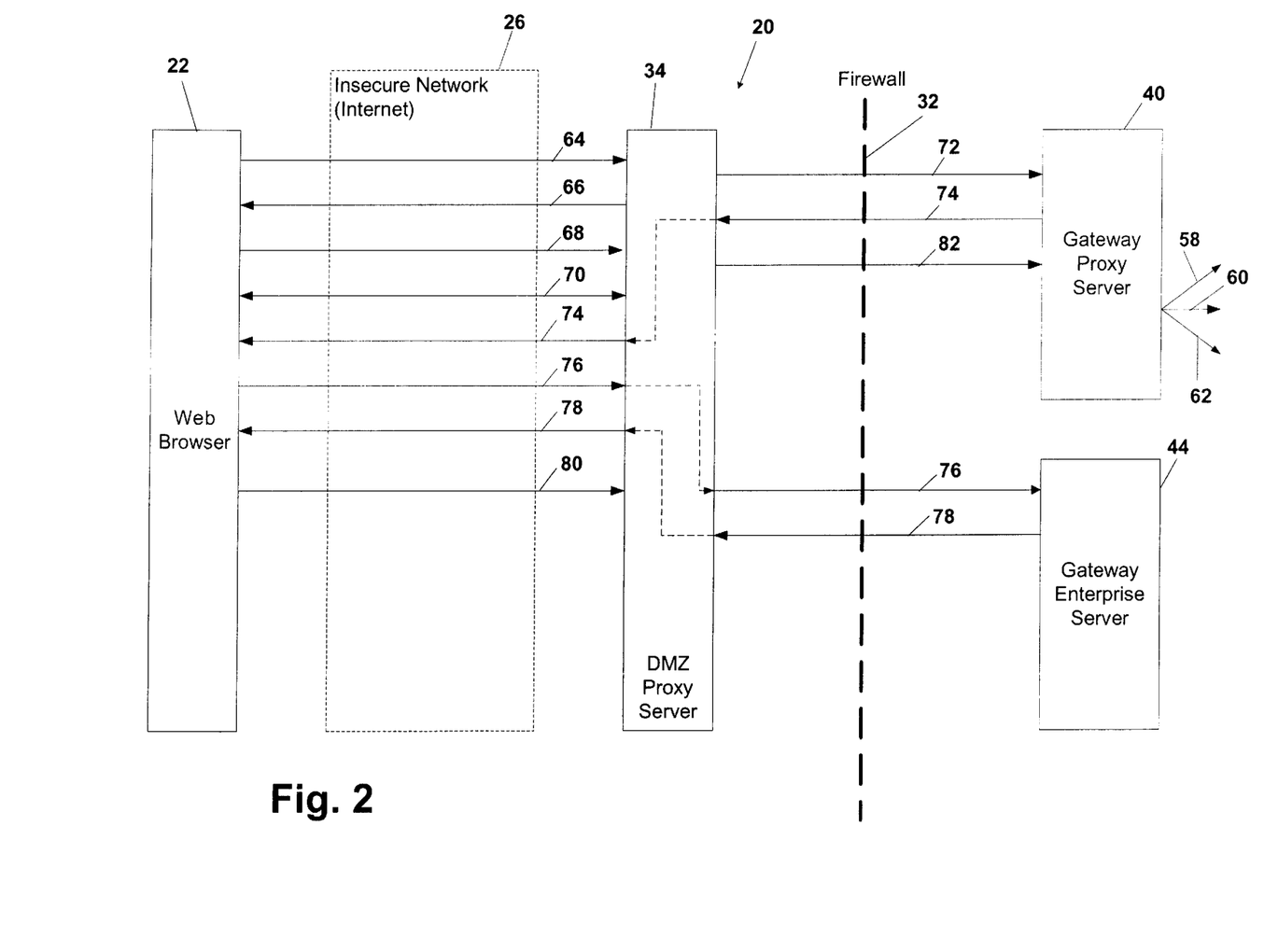
FIG. 2 is a simplified block diagram of the system of FIG. 1, showing the communications in greater detail.

FIG. 2 shows the messaging that occurs between client computer 22, DMZ proxy server 34, gateway proxy server 40 and gateway web server 44. User 18, via client computer 22, through its web browser, initiates a request 64 for authenticated secure access to one of the destination servers on the private network, which is received by DMZ proxy server 34. Messages 66, 68 and 70 represent the handshaking involved with establishing the secure connection 52. It bears emphasizing that user 18/client computer 22 only knows the Uniform Resource Locator (URL) of DMZ proxy server, not of the gateway proxy server or destination servers. DMZ proxy server 34 responds to the request 64 by transmitting a return message 66.

Message 66 will be used to authenticate the identity of DMZ proxy server 34 to client computer 22. For example, DMZ proxy server 34 may send client computer 22 its digital certificate. The web browser portion of client computer 22 is configured to analyze such certificate, and to authenticate DMZ proxy server 34. Message 66 will also contain a request to tender information sufficient to authenticate the user 18 of client computer 22 to the private network containing the applications $24_1, 24_2, \ldots, 24_3$. In this regard message 66 may cause a "popup" list to be presented to user 18 of client computer 22, soliciting the user's selection of a X.509 digital certificate.

The X.509 digital certificate so selected is transmitted in a message 68 back to DMZ proxy server 34. If the tendered X.509 digital certificate meets certain minimum, first level authentication requirements, further handshaking may occur, designated at message 70, as required to establish the secure connection 52, shown in FIG. 1. Further messages between client computer 22 and DMZ proxy server 34 are encrypted in accordance with a session key known to both client computer 22 and DMZ proxy 34. In one embodiment, DMZ proxy server 34 checks to see whether the digital certificate has been issued by a preapproved, certificate authority.

A second level authentication is commenced with a message 72. This authentication is done by comparing data from the digital certificate provided by client computer 22 with predetermined data about the certificate on authorization server 46. To secure the transfer of the digital certificate across firewall 32, DMZ proxy server 34 and gateway proxy server 40 establish second secure connection 54, shown in FIG. 1. It bears emphasizing that DMZ proxy server 34 only knows the URL of application gateway proxy server 40, not the URL of the destination servers. Only the mapping information for the gateway proxy server 40, which is kept in a local configuration file (behind the firewall), provides the URL/addresses of the destination servers.

One challenge, as described above, pertains to how the user of client computer's digital certificate is passed through firewall 32 for authentication. Plug-in 36 associated with DMZ proxy server 34 is configured to extract the digital certificate from the incoming message and pass it to gateway proxy server 40 in an HTTP header, as part of an HTTPS message 72.

Gateway proxy server 40 in turn passes information from the digital certificate tendered by the user of client computer 22 to authorization server 46, preferably in accordance with the LDAP protocol. Authorization server 46 returns authentication data indicative of whether the provided digital certificate successfully authenticates the user of client computer 22, as well as the identification of the applications $24_1$, $24_2$, . . . , $24_3$ to which access by the user 18 has been authorized. This information is returned, in a manner to be described in greater detail below, to DMZ proxy server 34 by gateway proxy server 40 by message 74. When the user is authorized for multiple applications, the user's browser is redirected to server 44.

Client computer 22 requests, by way of message 76, resources from gateway web server 44. Gateway web server 44 serves up the requested resource, namely an "options page", to client computer 22 in message 78. The "options page" presents a list of authorized applications $24_1$, $24_2$, . . . , $24_3$ for selection by user 18 of client computer 22.

The selection of one of the applications presented on the "options page" results in a message 80 being sent to DMZ proxy server 34. Message 80 is an HTTP command (over secure connection 54, thus HTTPS) that includes a composite URL comprising a base URL and an appended identifier. DMZ proxy server 34 routes message 80, based on the composite URL, to gateway proxy server in a message 82. The identifier is sufficient for gateway proxy server 40 to route message 82 to the selected application $24_1$, $24_2$, . . . , $24_3$.

Figures 3, 4A, 4B:
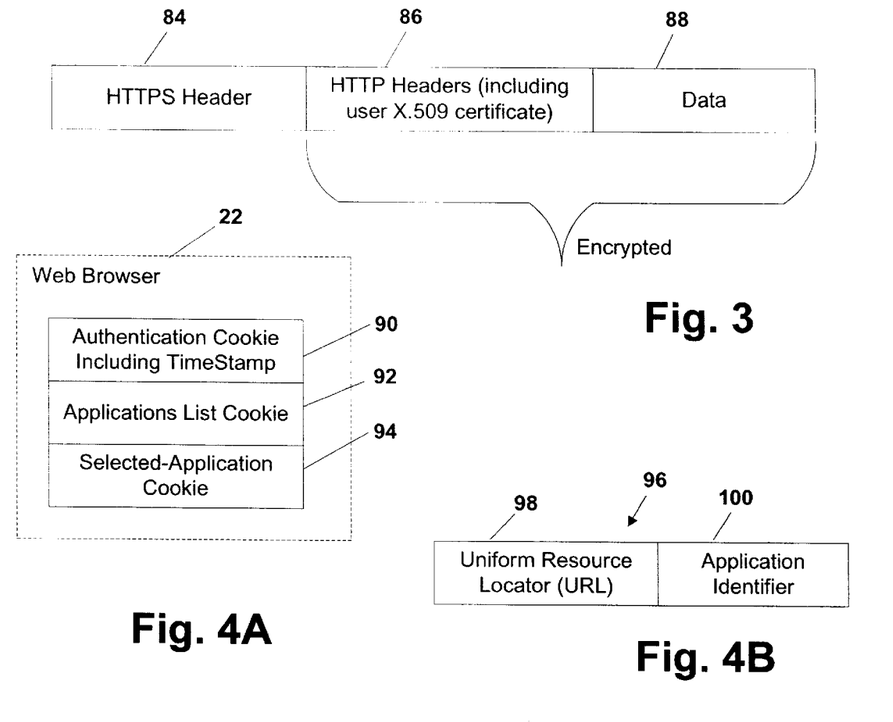
FIG. 3 is a more detailed block diagram of a message passed between the proxy server and the gateway of FIG. 1.
FIG. 4A is a more detailed block diagram of cookies created by system of the present invention.
FIG. 4B is a more detailed block diagram of a mechanism for routing manages to one of multiple applications.

FIG. 3 shows a simplified representation of message 72 that includes the data from the digital certificate of user 18 of client computer 22. Message 72 includes an HTTPS header 84, a plurality of HTTP headers 86, and a data portion 88. Note that DMZ proxy server 34 and gateway proxy server 40 message using secure connection 56, for example, using the SSL protocol (i.e., HTTPS). Accordingly, an HTTPS header 84 is used, while the payload, namely the HTTP headers 86 and the data portion 88, is encrypted. Plug-in 36 associated with DMZ proxy server 34 is configured to capture the X.509 digital certificate tendered by the user 18 via client computer 22, and form one or more HTTP headers that, collectively, convey the data contained in the digital certificate as a whole to gateway proxy server 40. In one embodiment, plug-in 36 may be implemented using standard application programming interfaces (API), for example, Netscape APIs (NSAPI) when Netscape proxy server software is used to implement DMZ proxy server 34.

FIG. 4A shows several "cookies" created by gateway proxy server 40: an authentication cookie 90, an applications list cookie 92, and a selected-application cookie 94. A cookie message is given to a client (e.g., a web browser) by a server. The client will cache the cookie, and store the cookie in a file on the client computer 22 if the cookie is a so-called "persistent" cookie. In one embodiment, the cookies are non-persistent and are therefore only cached in memory, not stored in a file on client computer 22. A part of the message is a description of the range of URL's for which that cookie is valid, and a time for which the cookie will persist (again, for "persistent" cookies only). Any future HTTP requests by the client which fall within that range will include the current value of the cookie (e.g., state object) to the server. Since HTTP is a stateless protocol (i.e., each HTTP command is executed by the server independently, without any knowledge of the commands that came before it), the "cookie" is a mechanism to carry forward information.

As described above, authorization server 46 returns authentication data to gateway proxy server 40 indicative of whether the tendered digital certificate successfully authenticated the user 18 of client computer 22, as well as an identification of applications $24_1$, $24_2$, . . . , $24_3$ for which access is authorized. In response thereto, gateway proxy server 40 builds authentication cookie 90, and applications list cookie 92. Authentication cookie 90 may include information such as timestamp information indicating a time of successful authentication. Applications list cookie 92 may include an identification of the particular applications for which client computer 22 is authorized. If only one application is authorized, selected application cookie 94 is built containing a description of that application. If there are a plurality of authorized applications, however, creation of the selected-application cookie 94 is deferred until after user 18 actually selects one of the applications from the "options page". The authentication cookie 90 and the application list cookie 92 are sent with message 74 to client computer 22 via DMZ proxy server 34, with a redirect to web server 44.

Cookies 90 and 92 are, in turn, provided (from client computer 22) with message 76 to gateway web server 44. Gateway web server 44, in turn, generates the "options page", using the information from applications list cookie 92. The HTML defining the "options page" is sent in message 78 to client computer 22.

Referring to FIG. 4B, each listed application available for selection on the "options page" includes a respective composite URL 96 comprising a base URL 98 and an identifier 100. For example, base URL 98, as an example only, may be HTTPS://url-of-dmz-server. Identifier 100 may be selected to identify or describe a particular one of the plurality of applications, but need not do so technically. For example, for a particular application $24_1$, $24_2$, . . . , $24_3$ involving billing, identifier 100, as an example only, may be "/billing"—a character string symbolic of the application, including a "slash" character as prefix. The identifier 100, as a whole, is preferably appended to the base URL as a suffix. The composite URL is sent in message 80 from client computer 22 through insecure network 26 to DMZ proxy server 34. DMZ proxy server 34 then maps the composite URL so as to route the incoming message 82 to gateway proxy server 40. This mapping may be a simple domain name replacement function (e.g., replace url-of-dmz-server with url-of-gateway-server, so as to end up with HTTPS://url-of-gateway-server/identifier. Authorization plug-in 42 is configured to recognize the identifier (e.g.,"/billing"), and to create in response thereto the selected-application cookie 94.

Figure 5:
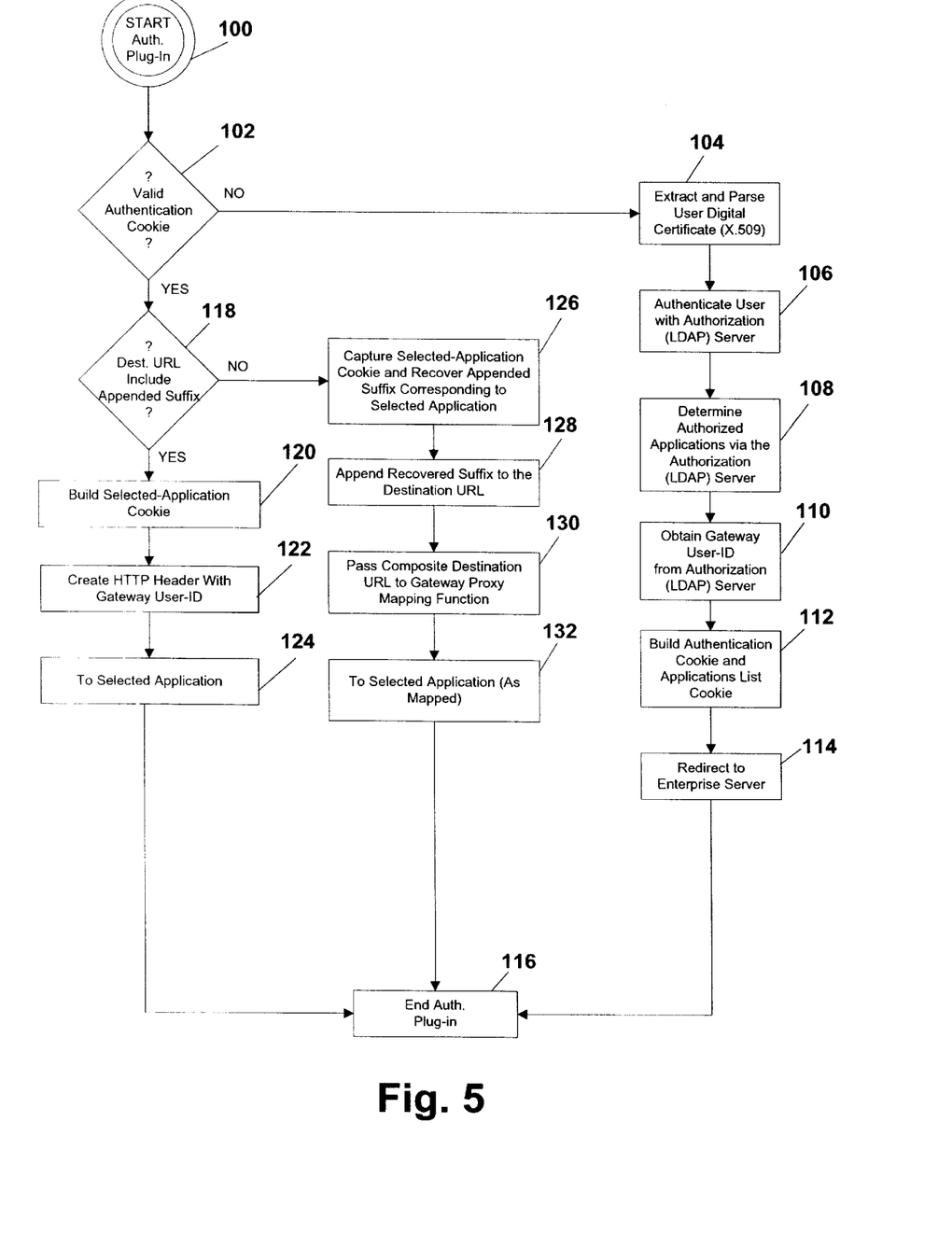
FIG. 5 is a simplified flow chart diagram showing the operation of a gateway proxy server of FIG. 1.

FIG. 5 is flow chart diagram showing the operation of authorization plug-in 42 associated with gateway proxy server 40.

In step 100, authorization plug-in 42 begins execution.

In step 102, authorization plug-in 42 checks to determine whether the incoming message contains a valid authentication cookie 90. Validity requires that the user's digital certificate has in-fact authenticated the user of the client computer 22, and, that the timestamp meets predetermined timing criteria (i.e., it must not be too old). In particular, the presence of authentication cookie 90 itself is indicative of a successful authentication. Because of the non-persistent nature of cookie 90, cookie 90 does not come from a stored file, but only as a result of a successful authentication. Then, the remaining requirement is that the timing criteria be satisfied. In one embodiment, a cookie 90 older than, preferably, 12 hours is considered "invalid". In another embodiment, a cookie 90 older than 4 hours is considered "invalid". The length of time may be selected based on expected maximum session duration by user 18. If the answer is "NO", then the method branches to step 104.

In step 104, authorization plug-in 42 extracts and parses the user's X.509 digital certificate from message 72, shown in simplified form in FIG. 3. The method proceeds to step 106.

In step 106, authorization plug-in 42 associated with gateway proxy server 40 queries authorization server 46 for authentication of the user 18. Plug-in 42 provides the X.509 digital certificate particulars in a message to authorization server 46. In step 108, authorization plug-in 42 determines the applications for which access by the user 18 is authorized, all through messaging with authorization server 46. In step, 110, gateway proxy server 46 obtains an overall gateway user identification (ID) for the user. This gateway user ID may facilitate access to and usage of the plurality of applications $24_1, 24_2, \ldots, 24_3$. For example, the overall gateway user ID may be passed to the application, which may use it to look up in its local database user profile information describing what functions the user is allowed to perform in the particular application. A gateway user ID cookie may be set to implement this information passing. Steps 106–110 may be performed sequentially, or as a composite request, or in any other way known in the art.

In step 112, authorization plug-in 42 builds authentication cookie 90, and applications list cookie 92, as described above.

In step 114, plug-in 42, through gateway proxy server 40, transmits cookie 90 (authentication cookie) and 92 (applications list) to client computer 22 through DMZ proxy server 34 via message 74. Message 74 also causes the web browser to be redirected to web server 44 via connection 56.

In step 116, the method ends.

However, if, in step 102, the answer is "YES", then the user/client computer 22 has already been authenticated. The method then branches to step 118.

In step 118, a test is performed to determine whether the composite, URL 96 associated with the incoming message includes the appended identifier 100. If "YES", then this means that the user 18 of the remote client computer 22 has just selected an application from the "options page". The "options page" is the only originating location that would generate a message bearing identifier 100. Subsequent messages originating from client computer 22 during use of a particular application would not be expected to have the appended identifier, since neither the applications $24_1, 24_2, \ldots, 24_3$ nor the browser are normally programmed to include such an identifier. If the answer to decision step 118 is "YES" then the method branches to step 120.

In step 120, the selected-application cookie 94 is built, using the identifier 100. Cookie 94 includes information corresponding to identifier 100.

In step 122, a gateway user identification cookie (i.e., an HTTP header) is built, using the gateway user ID information obtained in step 110.

In step 124, the incoming message is routed by gateway proxy server 40 to the particular destination server $28_1, 28_2, \ldots, 28_3$ corresponding to the selected application. Gateway proxy server 40 includes a mapping or routing function responsive to the appended identifier 100, and configured to identify the appropriate destination server 28. Identifier 100 may be omitted from the message that is eventually routed through one of connections 58, 60, and 62, since its purpose (i.e., routing) has already been satisfied. It is important to note that the selected-application cookie 94 now contains the information as to the selected application. Thus, subsequent messages, which include cookie 94, may be routed to the appropriate destination server. The method then proceeds to step 116, wherein the method ends.

If, however, the answer to decision step 118 is "NO", then the method branches to step 126. If the user of the client computer 22 has been authenticated, and no recognizable identifier is appended, then that means that this message is the second or subsequent message to go through the gateway proxy server 40 from the client computer 22 after authentication. As described above, the various application programs $30_1, 30_2, \ldots, 30_3$ are not generally programmed to append routing aids, nor should they be. Computer system 20 should handle the routing function transparently with respect to the various applications. In accordance with the present invention, computer system 20 transparently accomplishes this function in an efficient manner.

In step 126, the selected application cookie 94 is captured, and from which identifier 100 is recovered. For example, the identifier 100 may be "/billing" for a billing-related application.

In step 128, the recovered identifier 100 is appended to the URL specified in the incoming message. In a preferred embodiment, the identifier 100 is appended as a suffix. Accordingly, plug-in 42 includes the means for appending, prior to routing, identifier 100 to the URL contained in the incoming message. Other configurations, however, are possible, limited only by the capabilities of the mapping means included in gateway proxy server 40.

In step 130, the composite URL (including the appended identifier 100) is passed to the gateway proxy server's mapping function. This reconstructed composite URL thus contains the same information (i.e., the appended symbolic) in the same format as the initial composite URL originating from the user's selection from the "options page". The mapping function of proxy server 40, therefore, need not be changed or altered to handle second and subsequent messages as compared to the first message.

In step 132, the incoming message is routed to the destination server corresponding to the selected application (as mapped). The method proceeds to step 116, where the method ends.

In accordance with this aspect of the present invention, an efficient mechanism is provided for providing access from a client computer over an insecure network to a selected one of a plurality of destination servers on a private network. The use of a selected-application cookie 94, in connection with a suitably programmed plug-in 42, configured to append the identifier, operate in concert to effect efficient routing.

Figure 6:
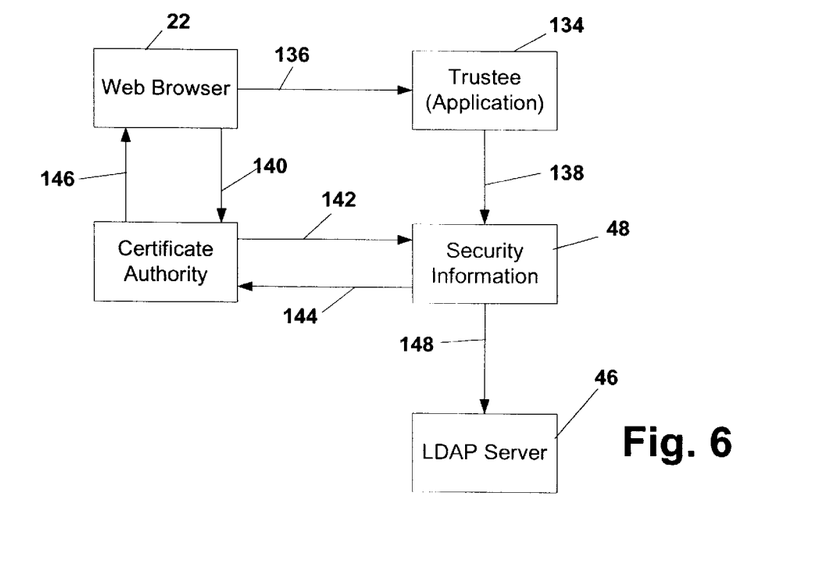
FIG. 6 is a block diagram showing the steps in obtaining a digital certificate for use with the system of FIG. 1.

FIG. 6 shows information flow for a user in obtaining an X.509 digital certificate for use in the present invention. Each application $24_1, 24_2, \ldots, 24_3$ has a respective trustee 134, who controls who is allowed to gain access to the application. Initially, a user 18 directs a message 136 to trustee 134, which includes information regarding the user. This communication (e.g., message 136) may be done by telephone. The trustee then provides the user with a user ID/password, with instructions to access the certificate authority 50 using the provided user ID/password. The trustee 134 then sends a message 138 to Information Security 48 that contains the information collected from the user 18, including what application(s) are being requested for remote access.

Information Security 48 may have a direct (e.g., web-based) interface 140 to authorization server 46 for the purpose of, for example, entering the user information forwarded to it by trustee 134.

The user 18 through client computer 22 according to the instructions given by the trustee then logs in to certificate authority 50 using the original user ID and password. After log-in, user 18 then directs a request 142 to certificate authority 50. Request 142 comprises the request for the certificate, which also includes information regarding user 18 and of the desired applications. The certificate authority 50 then provides user 18, perhaps via client computer 22, a PIN or the like (e.g., a reference number, a challenge phrase, etc.).

Information Security 48 may have a further direct (e.g., web-based) interface 144 to certificate authority 50. Information Security 48 uses interface 144 to monitor requests coming into certificate authority 50. When Information Security 48 sees user 18's request come in, it compares the information entered by user 18 at Certificate Authority 50 with the user information received via the trustee 134. If approved, Information Security 48 sends a reply message 146 indicating approval to certificate authority 50. Certificate authority 50 then notifies (e.g., e-mail) the user 18 that the request has been approved, and that the digital certificate is available. The user 18 then accesses the certificate authority 50, and logs in using the original user ID and password that were provided by trustee 134, and the PIN provided by certificate authority 50. When this information is accepted by authority 50, the digital certificate is sent as shown at 148 to the client computer 22. In one embodiment, the digital certificate is downloaded directly to client computer 22 of user 18 during the retrieval process (i.e., it is not sent later via e-mail). Information Security 48 is then notified of the certificate data from certificate authority 50. In turn, Information Security 48 forwards the certificate data via interface 140 to authorization server 46. Authorization server 46 is then updated.

In another aspect of the present invention, an improved method for obtaining an X.509 certificate is provided. In this aspect of the invention, after the initial user request to trustee 134 (including submission of required user information, identification of selected applications, etc.), the trustee 134 provides the collected data to Information Security 48. Trustee 134 also provides the user of client computer 22 with a user ID/password and PIN. Information Security 48 then updates the authorization server 46 directly. The user of the remote client computer 22 then contacts certificate authority 50, and provides the user ID/password and PIN. The certificate authority 50 pulls the information directly from authorization server 46 (i.e., there is a secure link between certificate authority 50 and authorizations server 46), and issues the digital certificate to the user of client computer 22 immediately. The certificate authority 50 thereafter updates authorization server 46 with the certificate data of the issued digital certificate. This method has the advantage of avoiding the re-keying of data from the user's perspective who, under the first-described method, entered data for the trustee, and again for the certificate authority. In addition, the improved approach provides a "one-stop" experience for user 18.

In another aspect of the present invention, a secure gateway is provided for allowing authenticated access from a client computer over an insecure public network to a destination server on a private network without the use of digital certificates. In applications where digital certificates are not required, there would be no "first level" authentication on the insecure network side of the firewall, as described above with respect to computer system 20. It would nonetheless be desirable to perform such authentication, at least on a preliminary level, on the insecure side of the firewall before allowing messages through the firewall to the destination servers.

Figure 7:
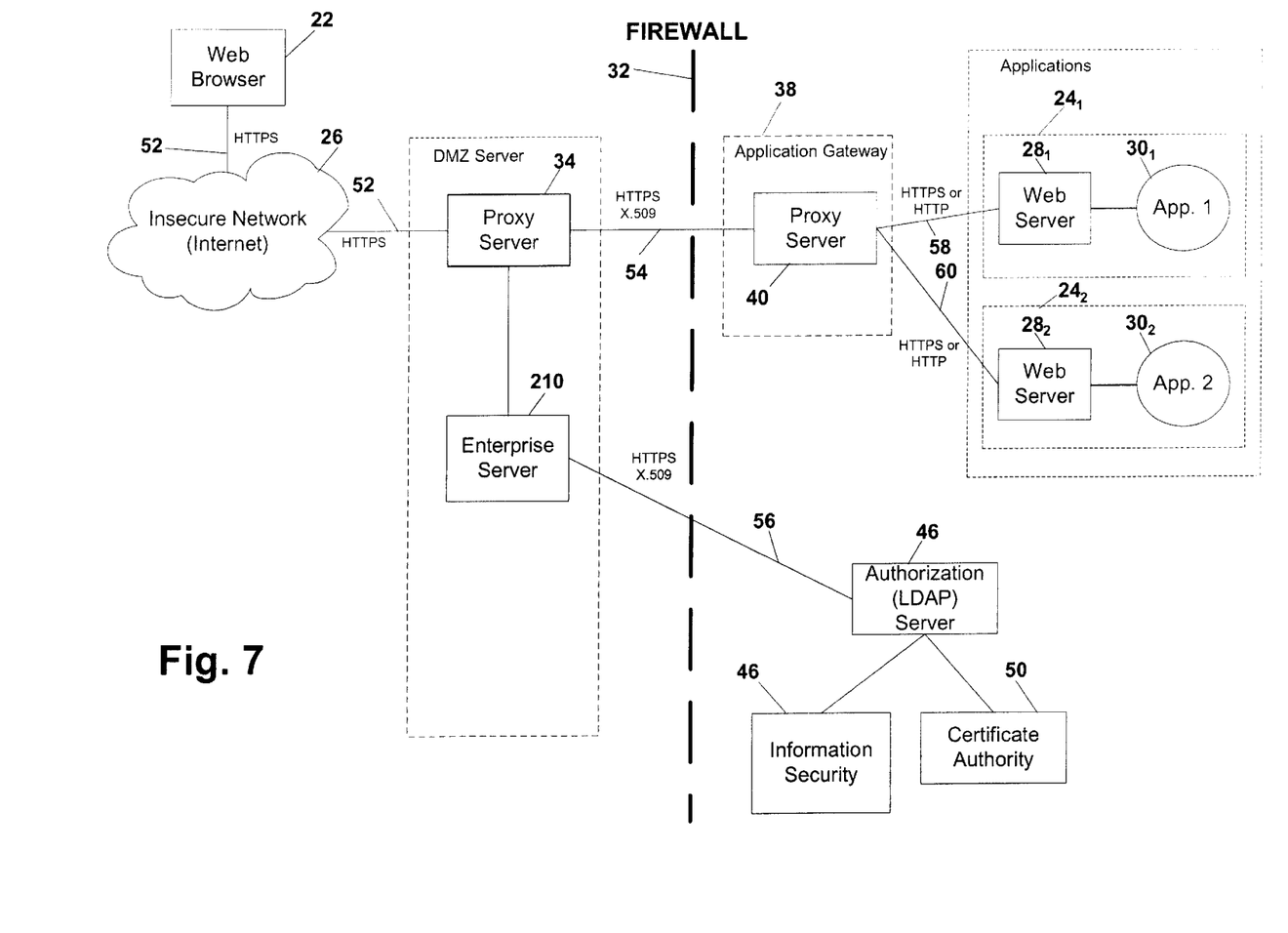
FIG. 7 is a simplified block diagram of a second computer system in accordance with the present invention; and, FIG. 8 is a simplified flow chart diagram showing the operation of the second system of FIG. 7.

FIG. 7 shows a simplified block diagram of a second embodiment according to the present invention, namely, computer system 200. Unless indicated to the contrary, the same reference numerals are used to identify identical or substantially similar components in the various views. Computer system 200 implements a user identification (ID) and password scheme for authenticating the user of client computer 22. FIG. 7 is similar to FIG. 1, except that a DMZ web server 210 is provided on the insecure network side of firewall system 32 in lieu of web server 44 on the private-network side. Although not shown in FIG. 7, DMZ proxy server 34 and gateway proxy server 40 include respective plug-ins 36, and 42, as described above with respect to computer system 20.

Figure 8:
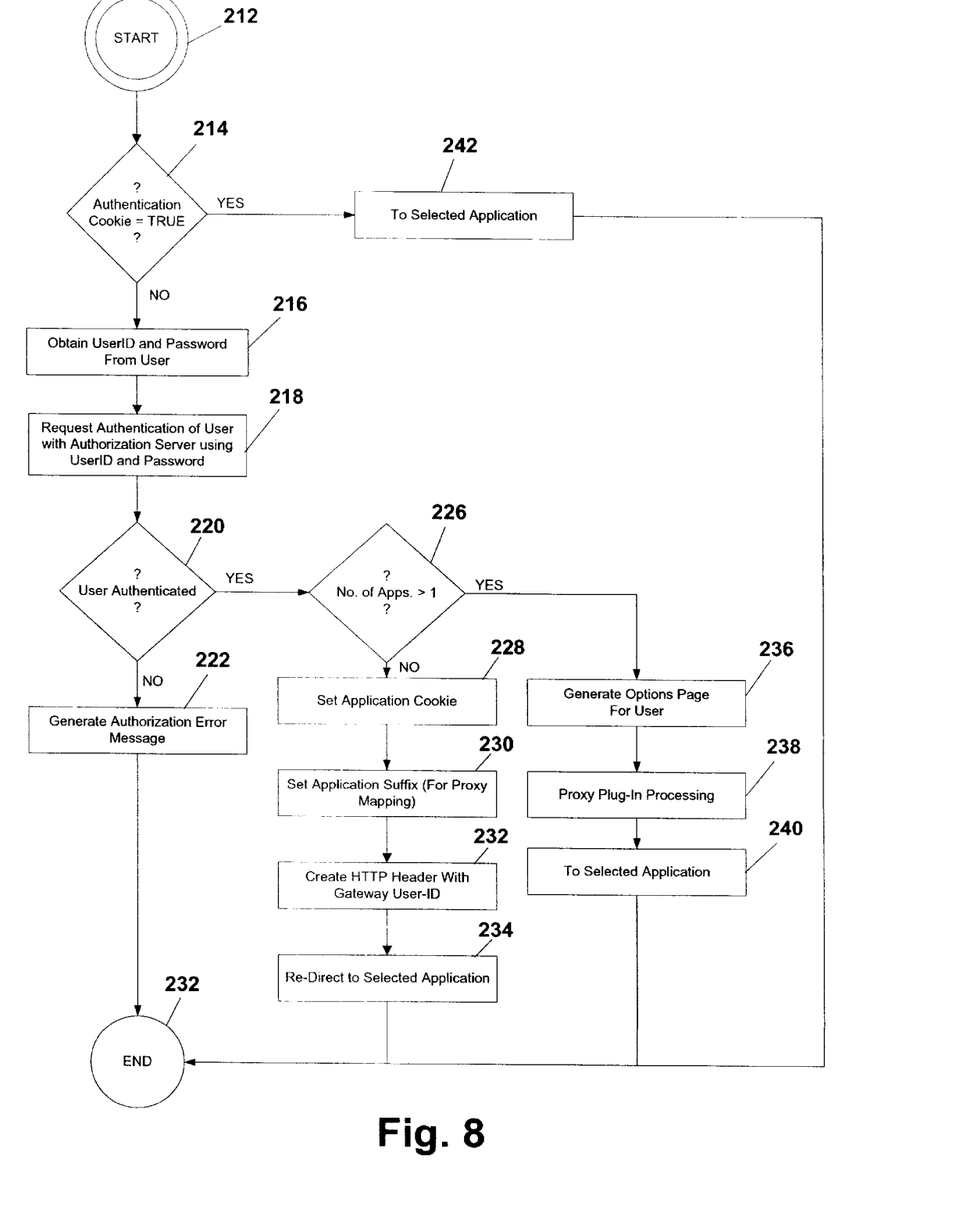

FIG. 8 is a flow chart diagram illustrating the inventive system and method for authenticating a remote client computer 22. The method begins in step 212.

In step 214, DMZ proxy server 34 via programmed plug-in 36 determines whether the incoming message contains a valid authentication cookie 90. As described above, the presence of cookie 90 itself, in conjunction with a timestamp that is not too old, may satisfy the requirements for a "valid" authentication cookie 90. A valid or "true" condition indicates that client computer 22 has already been successfully authenticated within the recent past. In an alternate embodiment, authentication cookie 90 may be configured to provide enhanced information such as status indicator information. The status indicator information may include an authorization boolean operator (e.g., TRUE, FALSE) data indicating whether the user is recognized by authorization server 46, and data indicating that the user is recognized by the authorization server 46, but that the password so provided has expired. If the answer to decision step 214 is "NO", then the method branches to step 216.

In step 216, web server 210 formats a message that is sent via proxy server 34, over secure connection 52, to client computer 22, which causes a "popup" login screen to appear to the user. A user identification (ID) and password is obtained from the user 18 of client computer 22, which is securely messaged back to web server 210 via DMZ proxy server 34.

In step 218, web server 210 formats a message that includes the user ID and password obtained from the user of the remote client computer 22, and sends that message through firewall 32 over secure connection 56 to authorization server 46. Also included in the message is a request for a response indicative of whether the user-provided user ID and password are sufficient to authenticate the user of remote client computer 22. The authorization server 46 may include an authorization daemon, a process configured to perform a lookup query in the authorization LDAP server portion of server 46. The response from server 46 may include authentication data representative of whether the user is authenticated or not, based on the supplied user ID and password. The response may also include an identification of the applications $24_1$, $24_2$, for which access is authorized. Based on the foregoing, web server 210 creates authentication cookie 90 (best shown in FIG. 4A).

In step 220, web server 210 determines whether the user is authenticated. This step may simply involve evaluating the response returned from authorization server 46. If the answer is "NO", then the decision step 220 branches to step 222.

In step 222, the user 18 of the remote client computer 22 is presented with an authorization error message, generated by web server 210. The method proceeds to step 224, where the process ends.

If the answer, however, to decision step 220 is "YES", then the method branches to step 226. In step 226, web server 210 determines whether the number of authorized applications is greater than one. If the answer is "NO", then the method branches to step 228.

In step 228, web server 210 creates (if needed), and sets the selected-application cookie 94. This may involve associating information, such as identifier 100, with cookie 94. For purposes of illustration only, identifier 100 may be a character string having a "slash" character as a prefix, such a "/billing" for a billing-related application.

In step 230, web server 210 sets an application suffix for proxy mapping. In effect, web server 210 is configured with the means for appending identifier 100 to base URL included in the incoming message. Since there is no "options page" for the situation where only one application is authorized, web server 210 appends identifier 100 for the initial message.

In step 232, web server 210 creates an HTTP header (e.g., a "cookie") having the gateway user ID. This may be useful or required by the applications $24_1$, $24_2$ executing on destination servers $28_1$, $28_2$. This feature has been described above.

In step 234, web server 210 sends a redirect message to client computer 22, redirecting the web browser portion of client computer 22 to request resources (e.g., for the initial message, the "Welcome Page") from the destination server 28 corresponding to the authorized application. The method then proceeds to step 224 where the method ends.

If the answer to decision step 226, however, is "YES", then the method branches to step 236.

In step 236, web server 210 generates the "options page" referred to above that lists all of the applications that client computer 22 is authorized to access. Once the user of the remote client computer 22 has made a selection of one of the applications, the client computer 22 sends an HTTP request encapsulated in an HTTPS message that includes a composite URL 96 comprising a base URL 98 and identifier 100. The method proceeds to step 238.

In step 238, plug-in 42 processing occurs. This processing is the same as described above with respect to computer system 20, and as shown in FIG. 5.

In step 240, the incoming message is directed to the destination server 28 corresponding to the selected application 24. The method ends at step 224.

If, however, the answer to the decision step 214 is "YES", then the method branches to step 242, wherein the incoming message is routed by DMZ proxy server 34, through gateway proxy server 40 to the destination server 28 corresponding to the selected application.

One advantage of computer system 200 is that it authenticates a remote client computer prior to allowing access to the secure, private network. Computer system 200 achieves authentication where use of digital certificates is either unavailable or undesirable. In addition, the architecture of computer system 200 maintains the sensitive, authentication data on the secure, private network side of the firewall, reducing the likelihood of a successful "hacker" intrusion.

It is to be understood that the above description is merely exemplary rather than limiting in nature, the invention being limited only by the appended claims. Various modifications and changes may be made thereto by one of ordinary skill in the art which embodies the principles of the invention and fall within the spirit and scope thereof.

I claim:

1. A computer system for providing access from a client computer over an insecure public network to a destination server on a secure private network, comprising:

a firewall system between said insecure network and said secure private network;

a proxy server on said insecure network side of said firewall system;

an authorization server on said private network side of said firewall system for authenticating a user of said client computer based on a user identification (ID) and password from said user of said client computer;

a web server on said insecure network side of said firewall system configured to pass said user ID to said authorization server and to build an authentication cookie when said authorization server authenticates said user of said client computer based on said user ID and password;

a gateway on said private network side of said firewall system; and wherein said proxy server is further configured to pass a message from said client computer to said destination server via said gateway when said authentication cookie is valid.

2. The computer system of claim 1 wherein said proxy server is configured to establish respective, secure connections with said client computer and said gateway, and said web server is configured to establish a respective secure connection with said authorization server.

3. A computer system for providing access from a client computer over an insecure public network to a destination server on a secure private network executing a corresponding application, said computer system comprising:

a firewall system between said insecure network and said secure private network;

a proxy server on said insecure network side of said firewall system configured to establish a secure connection over said insecure network with said client computer;

an authorization server on said private network side of said firewall system for authenticating a user of said client computer based on a user identification (ID) and password from said user of said client computer;

a web server disposed on said insecure network side of said firewall system configured to pass said user ID and password over a secure connection to said authorization server, said web server being further configured to build an authentication cookie when said authorization server authenticates said user of said client computer based on said user ID and password;

a gateway disposed between said proxy server and said private network on said private network side of said firewall system; and wherein said proxy server is further configured to pass a message from said client computer to said gateway over a secure connection when said authentication cookie is valid, said gateway being configured to route said message to said destination server.

4. The computer system of claim 3 wherein said connection to said proxy server through which said user ID and password is received from said client computer is secured using a Secure Sockets Layer (SSL) protocol.

5. The computer system of claim 3 wherein said authorization server comprises a lightweight directory access protocol (LDAP) capable server.

6. The computer system of claim 3 wherein said connection between said web server and said authorization server is secured using a Secure Sockets Layer (SSL) protocol, and wherein said web server and said authorization server provide authentication to each other using digital certificates compliant with an industry standard.

7. The computer system of claim 6, wherein said industry standard comprises an ITU X.509 standard.

8. The computer system of claim 3 wherein said connection between said proxy server and said gateway is secured using a Secure Sockets Layer (SSL) protocol, and wherein said proxy server and said gateway provide authentication to each other using digital certificates compliant with an X.509 standard.

9. The computer system of claim 3 wherein said private network includes a plurality of destination servers each servicing a corresponding application, said proxy server comprising a demilitarized zone (DMZ) proxy server and said web server comprising a DMZ web server, said gateway including a gateway proxy server, said DMZ web server being configured to transmit to said client computer a list of applications for which access by said user of said client computer is authorized according to said response by said authorization server, selection by said user at said client computer of one application from said list being operative to send to said gateway proxy server via said DMZ proxy server a uniform resource locator (URL) comprising a base portion and an identifier appended as a suffix thereto.

10. The computer system of claim 9 wherein said gateway proxy server is configured to receive said URL, to extract said identifier, and to build a selected-application cookie, said gateway proxy server being further configured to recognize said selected-application cookie and append said identifier to messages from said client computer.

11. The computer system of claim 10 wherein said gateway proxy server is further configured to route said messages based on said appended identifier.

12. A method for providing access by a client computer over an insecure public network through a proxy server to a destination server residing on a secure private network, said method comprising the steps of:

(A) receiving at the proxy server a request for authentication from a user of the client computer;

(B) establishing a first secure connection between the proxy server and the client computer;

(C) obtaining at a web server via the proxy server a user identification (ID) and password from the user of the client computer;

(D) establishing a second secure connection between the web server and an authorization server for transmission of the user ID and password;

(E) obtaining authentication data from the authorization server using the user ID and password;

(F) building an authentication cookie using the authentication data; and (G) routing messages from the client computer through the proxy server through a gateway to the destination server when the authentication cookie is valid.

13. The method of claim 12 further including the steps of:

providing a firewall system between the insecure public network and the secure private network;

positioning the proxy server and the web server on the insecure network side of the firewall system; and positioning the authorization server and the gateway server on the private network side of the firewall system.

14. The method of claim 13 wherein said routing messages step includes the substep of:

establishing a third secure connection between the proxy server and the gateway.

15. The method of claim 14 wherein said steps of establishing a second secure connection and receiving authentication data include communication in accordance with a hypertext transfer protocol secure (HTTPS).

16. The method of claim 15 wherein said step of routing messages is performed for every message destined for the destination server.

* * * * *